A. N. BENN.
PROCESS OF PICKLING AND CURING HAMS AND OTHER MEATS.
APPLICATION FILED NOV. 15, 1915.
1,195,176.
Patented Aug. 22, 1916.
2 SHEETS—SHEET 2.
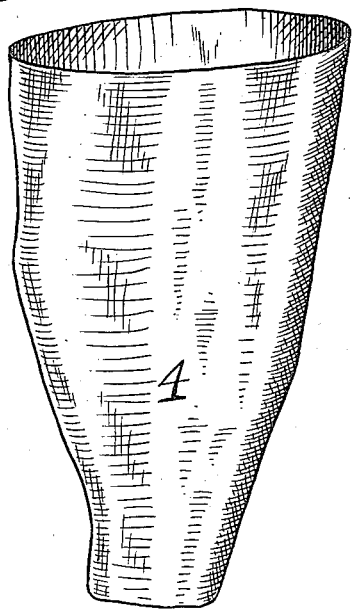
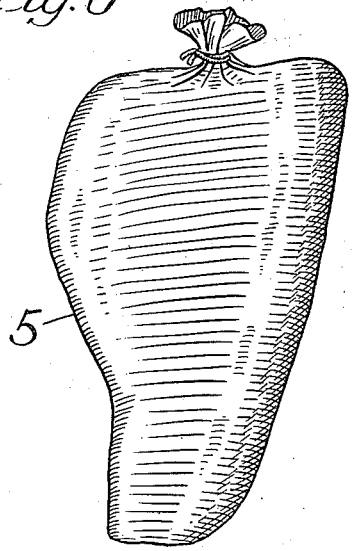
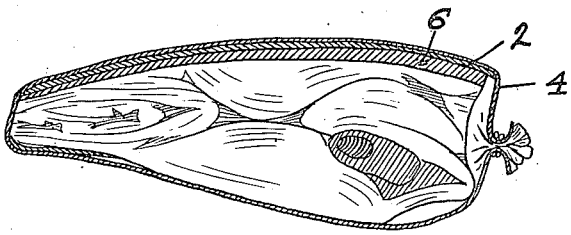

UNITED STATES PATENT OFFICE.

ALONZO NEWTON BENN, OF CHICAGO, ILLINOIS.

PROCESS OF PICKLING AND CURING HAMS AND OTHER MEATS.

1,195,176.

Specification of Letters Patent.　　Patented Aug. 22, 1916.

Application filed November 15, 1915.　Serial No. 61,556.

*To all whom it may concern:*

Be it known that I, ALONZO N. BENN, a citizen of the United States, residing at Chicago, in the county of Cook and State of Illinois, have invented a new and useful Improvement in Processes of Pickling and Curing Hams and other Meats, of which the following is a specification.

A large number of hams are cured and then prepared for boiling, cooking, baking or other purposes by having the skin lifted and the surplus fat removed, and it is to this class of hams and other meats that my invention chiefly relates.

In general terms hams are called "hams" when nothing has been removed from them and "skinned hams" when the skin and the surplus fat have been removed.

Reference will be had to the accompanying drawings in which:—

Figure 1:
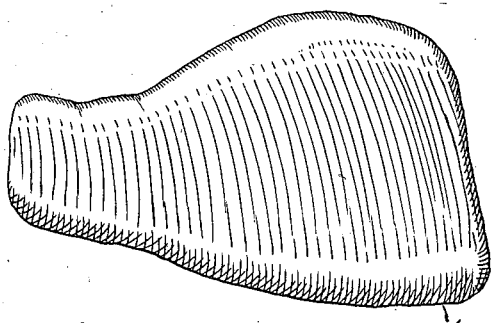
Figure 2:
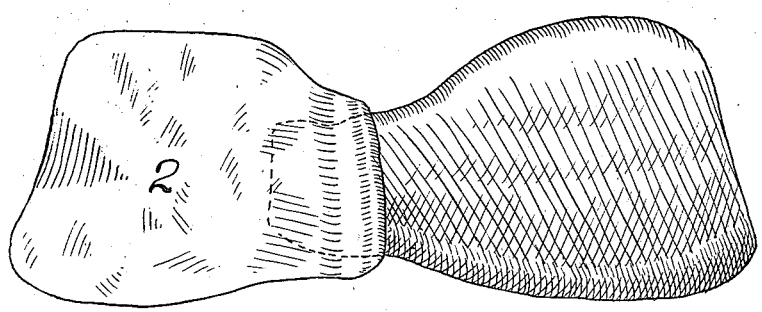
Figure 3:
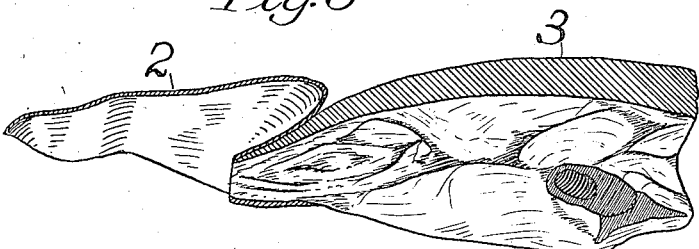
Figure 4:
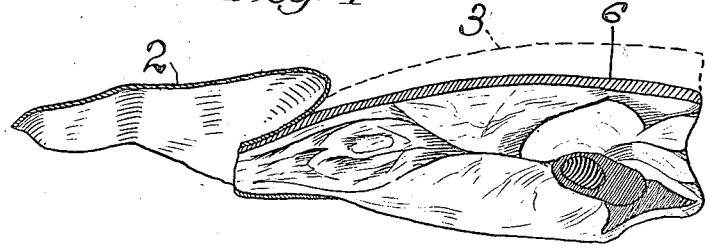

Figure 1, is a view of a fresh ham, Fig. 2, shows the ham with the skin lifted ready for the removal of the surplus fat, Fig. 3, is a longitudinal sectional view of Fig. 2, Fig. 4, is the same view as Fig. 3 after the surplus fat has been removed, Fig. 5 is a view of a stockinet, Fig. 6, is a view of the ham after the skin has been replaced and the ham inclosed in a stockinet, Fig. 7, is a longitudinal sectional view of Fig. 6.

In the drawings 1 indicates a fresh ham. 2 indicates the skin. 3 indicates the main body of surplus fat to be removed.

6 indicates the thin margin of fat allowed to remain on the ham.

4 indicates the stockinet and 5 the ham after it is inclosed in the stockinet and as it appears during the pickling and curing.

Heretofore the fresh hams were pickled and cured in the usual way and then the skin was lifted and the surplus cured fat removed, which cured fat was rendered into a second grade, or number two quality of lard.

By my process I take the fresh hams and lift the skin, excepting around a portion of the shank and with a suitable tool remove the surplus fat, amounting on an average of from fifteen to twenty-five per cent. of the total weight of the hams. Any bruised part on the skin portion of the body parts of the hams are also removed, after the skin has been lifted and turned back. The operator is provided with a special tool with which he reaches under the skin of the legs or shanks of the hams when necessary to remove any surplus fat or bruised parts therefrom, leaving the skin on the shanks normally in place as nearly as possible.

When the surplus fat and bruised parts have been removed, the entire skin is replaced and the remaining portions of the hams are covered with the stockinets, which hold the loose skin in place and protect the hams from dirt and further injury during the pickling and curing thereof.

By my process the hams may be cured in from twelve to fifteen per cent. less time than otherwise, thereby decreasing the curing expenses materially and at the same time the cost of curing and handling the surplus fat as before stated, such fat amounting to from fifteen to twenty-five per cent. of the total weight of the ham.

With my process, the surplus fat is taken directly from the fresh hams and rendered into lard, without curing, thus making a better quality of lard than when the fat is removed and rendered into lard after the pickling and curing process.

What I claim is,

A process of curing hams and other meats, which consists in lifting the skin, removing the surplus fat and bruised parts, replacing the skin, then inclosing the hams in stockinets and then pickling and curing the hams while within the stockinets.

Signed at Chicago, county of Cook, and State of Illinois this 11" day of November, 1915.

ALONZO NEWTON BENN.